Oct. 5, 1937.     G. MONZEE ET AL     2,094,901
HOMOKINETIC CARDAN JOINT
Filed April 15, 1936
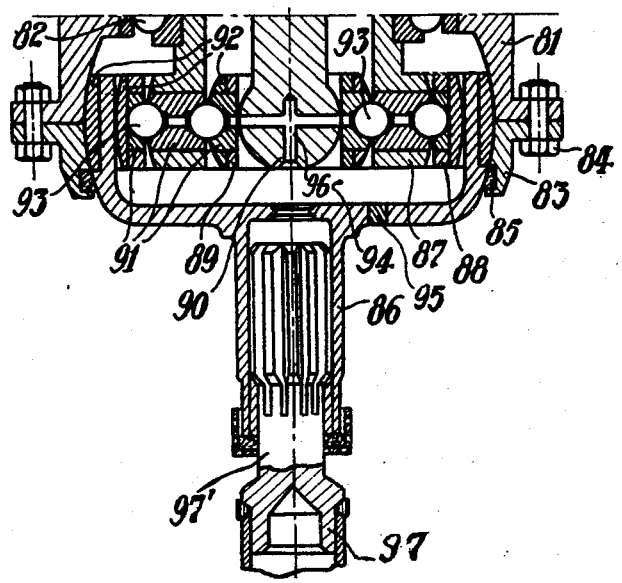
INVENTORS:
GEORGES MONZÉE AND
JOSEPH ALBERT JOSKIN
PER:
ATTORNEY

UNITED STATES PATENT OFFICE 2,094,901

HOMOKINETIC CARDAN JOINT

Georges Monzee and Joseph Albert Joskin, Liege, Belgium

Application April 15, 1936, Serial No. 74,466
In Belgium November 29, 1935

1 Claim. (Cl. 64—21)

For transmitting rotary motion between two disalined shafts, which may be called main shafts, meeting with each other in one point, use is now made of Cardan joints comprising, between the driving and the driven shafts, a device, for instance a spider, having four studs, this device comprising substantially two rotating axes at right angles to one another and one of which forms an integral part with the driving shaft and the other with the driven shaft. For the purpose of clearness, both axes may be called auxiliary shafts.

When the two main shafts are out of alinement, these joints do not transmit uniform angular speeds, that is, the angular speed of the driving shaft is constant but that of the driven shaft passes, during one complete rotation, through two maxima and two minima which increase or decrease respectively in accordance with the angular positions of the shafts.

The invention has for its object a homokinetic Cardan joint formed by a double joint arrangement, that is a combined structure of two superposed single joints.

The improved Cardan joint illustrated in axial section in the figure of the accompanying drawing comprises: the carter 81 of the differential, the double thrust ball bearings 82 for the conical sleeve 87 of the double joint 86, the spherical member 83 for holding the joint upon the carter of the differential, the bolts 84 for mounting the joint upon the differential, the packing 85 preventing the escape of lubricant, the cylindrical housing 86 with fluted extension for the transmission shaft, the connecting sleeve 87 of the double joint mounted in ball bearing 82, insert rings 88 and 89 for the outer and inner joints, the driving shaft 90 mounted within the differential, the blocks 91 forming the retaining sockets for the balls, the pressure rings 92 for fixing said blocks, the balls 93 mounted in their respective sockets, the reservoir for the lubricant 94, the admission opening 95 for said lubricant, and the lubrication conduits 96.

As illustrated, this double joint formed by two superposed single joints is used with the projecting shaft of a differential. The driving shaft 90 is held in the differential by means of a fluted engagement. The insert ring 89 is mounted, by ball-and-socket connections 91 and 93, upon a connection sleeve 87, mounted in the carter upon ball bearings, said sleeve being fixed or movable around the center of the double joint. This connection sleeve 87 is integral with the two joints and constitutes the transmission means for neutralizing the movements of both joints. The insert ring 88 of the outer joint is fixed at right angles with respect to the inner ring 89, by the known ball-and-socket connections. The two connection axes of the outer and inner rings are thus symmetrical with respect to the connection sleeve 87. The housing 86 of the double joint is provided with a hollow extension having inner flutes for the engagement of the transmission shaft 97. The transverse connections in this double joint are preferably arranged at right angles. These connections are formed by means of the blocks 91, provided with the sockets for the balls 93. These blocks are held by the rings 92. The double joint is fixed to the differential by a spherical member 83, provided with the necessary packing 85 for preventing the escape of lubricant. The reservoir 94 is supplied with lubricant through the aperture 95.

The connecting sleeve 87, located between both joints, is suspended in this case within the housing, and this constitutes a particular feature of this double joint. It must be understood that, according to the applications, this sleeve 87 may be mounted upon a fixed seat or upon a movable seat or in the shape of a knuckle for allowing intermediate movements with respect to the two joints united by this sleeve, and this depends mainly upon the particular applications and the disalinement of the main shafts.

The device according to the invention presents the advantage to enable the assemblage of the parts by setting rings without the use of bolts or like mechanical means. The auxiliary axis formed with three elements comprising conical and cylindrical sockets enclosing a ball secures a structure in which said balls remain completely independent of the various movements imparted to the ball and socket connections; therefrom results that the ball is only submitted to the pressure effort within the resistance of the sockets. This structure secures a large efficiency and the advantage is that the main elements of the joint are prevented from wear by friction; only the sockets are subjected to wear and they can be replaced easily and at low cost. All the other structure elements of the joint will last for an unlimited time, because they are not submitted to wear. The intermediate element forming the connection between the superposed joints secures a constant angular speed in the transmission between the shafts. Whatever may be the angular position between the two superposed joints, the intermediary element will be displaced from its seat in a determined intermediary proportion with respect to both shafts.

The improved homokinetic Cardan joint is easily and rapidly dismounted and repaired. The lubrication is efficiently secured by the axial movements of the fluted shaft 97 moving in the slidable connection of the double joint, the movements of this joint having a pumping action capable of repelling the lubricant of the reservoir 94 towards the conduits 96.

We claim:

A universal joint comprising a driving shaft, a cylindrical housing at the end of the driving shaft, a driven shaft end engaging said housing, a set of three concentric annular insert members between the driving shaft end and the housing, and diametrically opposite ball-and-socket connections between the driving shaft end and the inner insert member and the inner and intermediate insert members and between the intermediate and outer insert members and the outer insert member and the housing.

GEORGES MONZEE.
JOSEPH ALBERT JOSKIN.